United States Patent [19]

Miyagishima et al.

[11] 4,305,595
[45] Dec. 15, 1981

[54] COMPOSITE SEAL

[75] Inventors: Tosh Miyagishima; William Carbaugh, both of Los Angeles, Calif.

[73] Assignee: Hydril Company, Los Angeles, Calif.

[21] Appl. No.: 144,993

[22] Filed: Apr. 30, 1980

[51] Int. Cl.³ .......................... F16J 15/20; F16J 15/32
[52] U.S. Cl. .................................... 277/152; 277/165; 277/188 A; 277/207 R
[58] Field of Search ............... 277/152, 153, 165, 180, 277/188 R, 188 A, DIG. 6, 207 R

[56] References Cited

U.S. PATENT DOCUMENTS

| | | | |
|---|---|---|---|
| 2,370,913 | 3/1945 | Procter | 277/153 X |
| 2,926,976 | 3/1960 | Bowerman et al. | 277/188 R X |
| 3,473,814 | 10/1969 | Bastow | 277/188 A |
| 4,059,280 | 11/1977 | Eastwood | 277/165 X |

FOREIGN PATENT DOCUMENTS

| | | | |
|---|---|---|---|
| 836669 | 6/1960 | United Kingdom | 277/180 |
| 1056960 | 2/1967 | United Kingdom | 277/188 A |

*Primary Examiner*—Robert S. Ward, Jr.
*Attorney, Agent, or Firm*—Pravel, Gambrell, Hewitt, Kirk, Kimball & Dodge

[57] ABSTRACT

A composite seal is adapted to fit in a groove formed in the outer surface of a first body and project outwardly to engage a second body spaced apart from the first body and form a fluid-tight seal between the two bodies. The seal includes an elongated raised portion which engages the second body and is formed of a deformable material. The seal further includes a pair of retainer portions formed of a material stiffer than the raised portion, the raised portion being formed integral with and located between the retainer portions. The raised portion projects outwardly beyond the outer ends of the retainer portions. The seal also includes recesses between the raised portion and both retainer portions extending below the outer ends of the retainer portions so that when the second body moves closer to the first body the material forming the raised portion will deform and flow into the recesses. The respective outer ends of the raised portion and the retainer portions are spaced apart a sufficient distance so that when one of the first and second bodies moves laterally relative to the other body the material of the raised portion will deform and cause material to fill the recess on that side of the raised portion and the raised portion to fill the space between the second body and the outer end of the appropriate retainer portion without flowing beyond the retainer portion.

5 Claims, 4 Drawing Figures

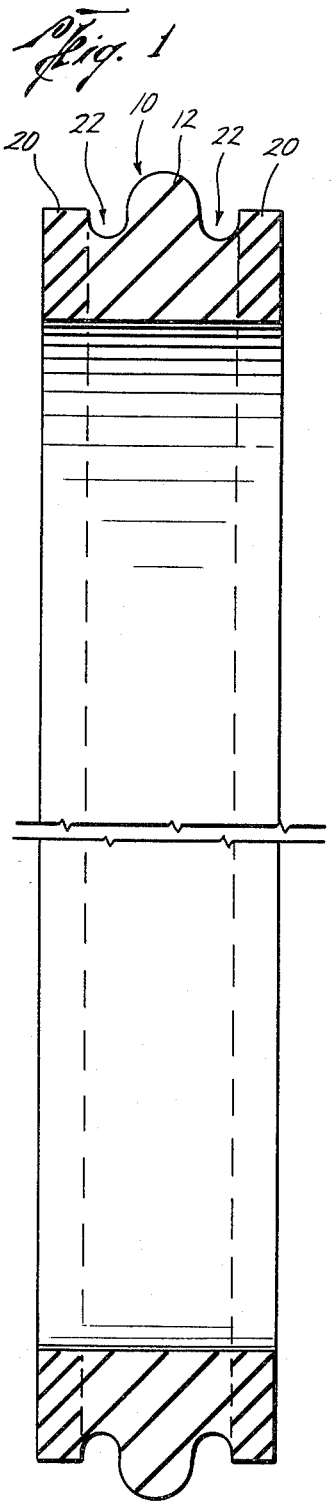
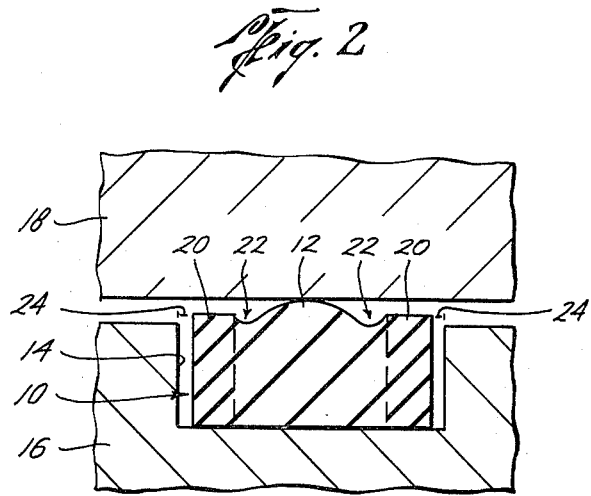
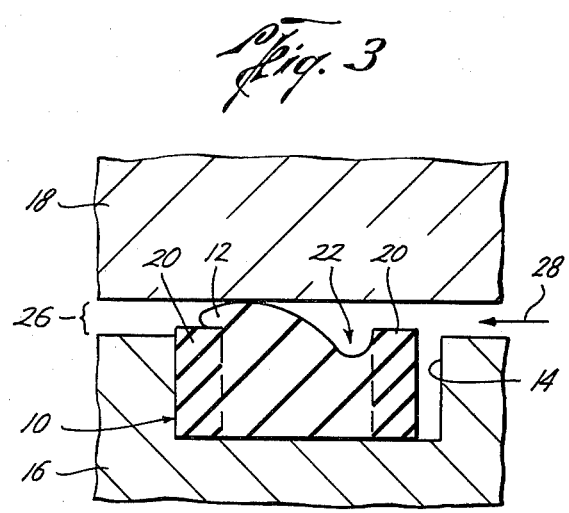
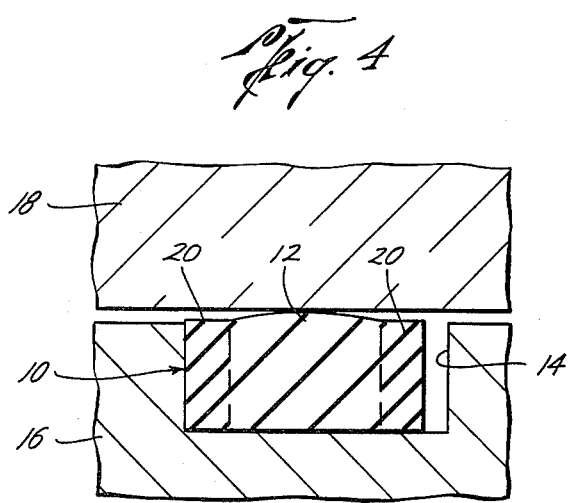

COMPOSITE SEAL

TECHNICAL FIELD

The subject invention relates to annular seals and, more particularly, to a composite seal which is effective under high pressures and can accommodate a relatively wide range of relative movement between adjacent surfaces.

The distance between adjacent surfaces engaged by a standard O-ring type seal must be maintained between relatively narrow limits because of the inherent inability of the seal to expand or contract any great amount. Further, if one of the surfaces should move laterally relative to the other surface the O-ring can be deformed and pulled out of its groove, thereby breaking the pressure tightness of the seal.

DISCLOSURE OF THE INVENTION

A seal has been developed in accordance with the invention which is much more versatile than the standard O-ring seal and allows adjacent surfaces to move greater distances toward and away from each other as well as laterally relative to each other while maintaining an effective high pressure seal between them.

The seal is mounted in a groove formed in the surface of one of the bodies and is a composite structure made up of two separate portions. A central raised portion projects out of the groove and engages the second body and is formed of a deformable material which is relatively pliable. The other portion of the seal is made up of retainer portions formed of a material which is stiffer or less pliable than the raised portion. The portions can be formed of the same material with different stiffness or of different materials. The raised portion is formed integral with and between the retainer portions and projects outwardly from the groove beyond the outer ends of the retainer portions which themselves extend a short distance beyond the outer end of the groove.

The seal includes a recess formed between the raised portion and each of the retainer portions which extends below the outer ends of the retainer portions so that when the first and second bodies move closer to each other, force exerted on the raised portion by the second body will cause the raised portion to deform and flow into the recesses while the less pliable retainer portions retain their shape.

The respective outer ends of the raised and retainer portions project outwardly different distances, the difference being small enough so that when one of the first and second bodies moves laterally relative to the other body the force exerted on the raised portion by the second body will cause the raised portion to deform laterally, filling the recess on that side and the space between the second body and the outer end of the appropriate retainer portion without flowing beyond the retainer portion.

In this way, a versatile seal is provided which allows adjacent surfaces between which a seal is formed to move toward and away from each other greater distances than possible with typical O-rings. The raised portion of the seal can be designed to project outwardly a relatively great distance and still engage the second body for maintaining the pressure seal. When the surfaces move closer together the raised portion deforms and flows into the recesses for providing a greater range of in and out movement without distoring the seal. When there is lateral movement between the adjacent surfaces the raised portion deforms as described above and maintains the seal without becoming distorted or being pulled out of its groove.

A seal of this design has additional advantages of being formed in one piece which simplifies installation. The symmetry of the seal allows it to be installed in either direction which eliminates the possibility of installation error.

BRIEF DESCRIPTION OF THE DRAWINGS

A better understanding of the invention can be obtained when the detailed description set forth below is considered in conjunction with the drawings, in which:

FIG. 1 is a sectional view of the composite seal formed with an annular shape;

FIG. 2 shows the seal mounted in a groove and a normal clearance between adjacent surfaces;

FIG. 3 shows the position of the seal location when hydraulic pressure is introduced; and FIG. 4 shows the seal when the surfaces have moved toward each other.

BEST MODE FOR CARRYING OUT THE INVENTION

As shown in FIG. 1, a seal 10 formed in accordance with the invention can be formed in an annular shape so it can be used in applications in which typical O-rings are presently used for providing a fluid-tight seal between adjacent surfaces. The seal 10 can be formed in other suitable linear and curved shapes.

The seal 10 is a composite of two portions, one being a central raised portion 12 which, as shown in FIGS. 2, 3 and 4 projects outwardly from a groove 14 located in a first body 16 and engages the adjacent surface of a second body 18. The seal also includes a pair of retainer portions 20. The raised portion 12 is formed integral with and located between the retainer portions 20. As shown, the outer end of the raised portion 12 projects beyond the outer ends of the retainer portions 20. The seal also includes a recess 22 formed in the central raised portion 12 adjacent to each retainer portion 20. The recesses 22 extend below the outer ends of the retainer portions 20.

The raised portion 12 is formed of a deformable material which is relatively pliable. The retainer portions 20 are formed of a material stiffer or less pliable than the material used to form the raised portion 12. The seal portions can be formed of the same or different materials which have the properties mentioned above. In a preferred embodiment of the invention, both portions are formed of nitrile rubber, the rubber of the raised portion 12 having a hardness of 70 on the Shore durometer scale while the retainer portions 20 have a hardness of about 92. In order to fabricate the seal as a composite structure, the retainer portions 20 are molded first as separate elements and then placed in a transfer mold (not shown) into which additional material for the raised portion is charged and cured. The composite is then vulcanized to increase the elasticity, strength and stability of the seal.

As shown in FIG. 2, the composite seal can be mounted in the groove 14 so that there is a gap 24 formed between each side of the seal 10 and the vertical wall 14 so that the seal can float in the groove 14. When the bodies 16 and 18 are in the positions shown in FIG. 2, slight pressure is exerted by the body 18 on the upper end of the raised portion 12 and a fluid-tight seal is formed between the two bodies. In FIG. 3, the composite seal is shown where the bodies 16 and 18 are positioned apart where the gap between them indicated by reference numeral 26 is at the extreme. The seal 12 becomes distorted when the seal is subjected to hydraulic pressure indicated by arrow 28.

The combination of the lateral and downward forces exerted against the raised portion 12 will cause the raised portion 12 to deform and flow against the stiffer retainer portion 20, thus filling the recess 22 on that particular side of the seal 10 and the gap between the top of the retainer portion 20 and the body 18. This can be accomplished when the respective outer ends of the raised portion 12 and the retainer portions 20 are spaced apart a sufficient distance and the raised portion 12 is sized so that the raised portion 12 is prevented from flowing or extruding through the gap at the maximum effective clearance between the bodies 16 and 18. The different pliabilities of the retainer portions 20 and the raised portion 12 will cause the retainer portions to maintain their shape and that of the main body of the seal while the raised portion deforms as shown. In this way, an effective seal is maintained between adjacent bodies regardless of relative lateral movement.

As shown in FIG. 4, if the body 18 moves closer to the body 16 than shown in FIG. 2 the force exerted downwardly on the outer end of the raised portion 12 by the body 18 will cause the material in the raised portion to deform and flow into the recesses 22. The relatively greater stiffness of the retainer portions 20 insures that the seal will maintain its general shape and not become distorted. By balancing the size of the raised portion 12 against that of the recesses 22 an effective range of movement of the bodies 16 and 18 toward and away from each other can be accommodated. A significantly greater tolerance range than possible with standard O-ring seals is thus provided which directly results in lower fabrication costs for the components which form the bodies 16 and 18 because their tolerances can be increased.

A further advantage of the seal 10 is that it is symmetrical in shape so that it can be installed in either direction which eliminates the possibility that the seal could be installed backwards and affect its operational effectiveness. Further, the seal is formed as a one piece composite so that installation is simplified.

The foregoing disclosure and description of the invention are illustrative and explanatory thereof, and various changes in the size, shape and materials as well as in the details of the illustrated construction may be made without departing from the spirit of the invention and all such changes are contemplated as falling within the scope of the appended claims.

We claim:

1. Composite seal adapted to fit in a groove formed in the outer surface of a first body and project outwardly to engage a second body spaced apart from the first body and form a fluid-tight seal between the two bodies, the seal comprising an elongated raised portion which engages the second body and is formed of a deformable material, the seal further comprising a pair of retainer portions formed of a material stiffer than the raised portion, the raised portion being formed integral with and located between the retainer portions, the raised portion projecting outwardly beyond the outer ends of the retainer portions, the seal further including recesses between the raised portion and both retainer portions extending below the outer ends of the retainer portions so that when the second body moves closer to the first body the material forming the raised portion will deform and flow into the recesses, the respective outer ends of the raised portion and the retainer portions being spaced apart a sufficient distance so that when one of the first and second bodies moves laterally relative to the other body the material of the raised portion will deform and cause material to fill the recess on that side of the raised portion and the raised portion to fill the space between the second body and the outer end of the appropriate retainer portion without flowing beyond the retainer portion.

2. The seal of claim 1, wherein the seal portions are in the shape of a ring.

3. The seal of claim 1, wherein the seal portions are formed of the same material.

4. The seal of claim 3, wherein the seal portions are formed of nitrile rubber with the raised portion having a hardness of about 70 and the retainer portions having a hardness of about 92 on the Shore durometer scale.

5. The seal of claim 3, wherein the seal portions are molded together into a single composite unit.

* * * * *